(12) United States Patent  
Griesinger et al.

(10) Patent No.: US 8,930,766 B2  
(45) Date of Patent: Jan. 6, 2015

(54) TESTING MOBILE APPLICATIONS

(71) Applicants: Regina Griesinger, Heidelberg (DE); Marcus Behrens, Heidelberg (DE); Christoph Mecke, Stutensee (DE)

(72) Inventors: Regina Griesinger, Heidelberg (DE); Marcus Behrens, Heidelberg (DE); Christoph Mecke, Stutensee (DE)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 13/630,530

(22) Filed: Sep. 28, 2012

(65) Prior Publication Data

US 2014/0095933 A1    Apr. 3, 2014

(51) Int. Cl.  
*G06F 11/00* (2006.01)

(52) U.S. Cl.  
USPC .......... 714/38.1; 714/33; 714/38.14; 717/124

(58) Field of Classification Search  
CPC . G06F 11/36; G06F 11/3672; G06F 11/3676; G06F 11/368; G06F 11/3684  
USPC ................. 714/32, 33, 38.1, 38.14; 717/124  
See application file for complete search history.

(56) References Cited

U.S. PATENT DOCUMENTS

| | | | |
|---|---|---|---|
| 6,725,399 B1 * | 4/2004 | Bowman | 714/38.14 |
| 6,895,577 B1 * | 5/2005 | Noble et al. | 717/126 |
| 7,729,891 B2 * | 6/2010 | Fine et al. | 703/2 |
| 8,209,638 B2 | 6/2012 | Hoff et al. | |
| 8,645,921 B2 * | 2/2014 | Bassin et al. | 717/127 |
| 8,689,188 B2 * | 4/2014 | Bassin et al. | 717/124 |
| 2003/0196190 A1 * | 10/2003 | Ruffolo et al. | 717/124 |
| 2006/0150022 A1 * | 7/2006 | Malik | 714/38 |
| 2011/0067005 A1 * | 3/2011 | Bassin et al. | 717/127 |
| 2012/0017195 A1 * | 1/2012 | Kaulgud et al. | 717/101 |
| 2012/0284697 A1 * | 11/2012 | Choppakatla et al. | 717/127 |
| 2013/0339930 A1 * | 12/2013 | Xu | 717/125 |
| 2014/0033176 A1 * | 1/2014 | Rama et al. | 717/124 |
| 2014/0136901 A1 * | 5/2014 | Butler et al. | 714/38.1 |

* cited by examiner

*Primary Examiner* — Marc Duncan  
(74) *Attorney, Agent, or Firm* — Fish & Richardson P.C.

(57) ABSTRACT

The present disclosure involves systems, software, and computer implemented methods for identifying test cases. One example process includes operations for identifying a mobile application to perform testing upon. A test environment and at least one risk situation associated with the mobile application are identified. For each of the at least one identified risk situations, at least one risk situation-relevant context parameter is identified. A standard operations path is created, as is at least one operations path-variant for each of the at least one identified risk situation-relevant context parameters. The corresponding operations path-variant is analyzed to identify a set of test cases for the context parameter, for each of the at least one identified context parameters.

23 Claims, 12 Drawing Sheets

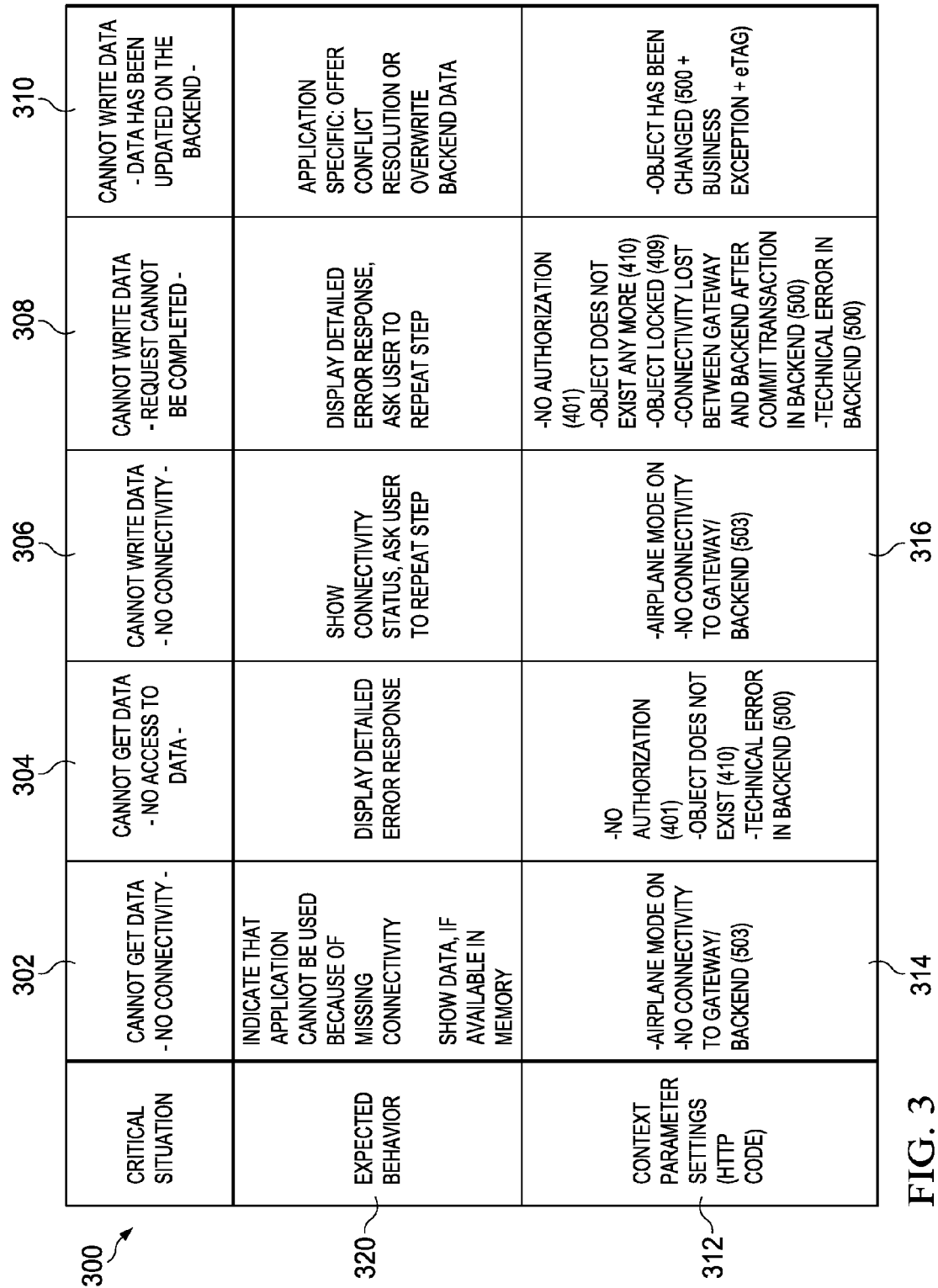

| | 302 | 304 | 306 | 308 | 310 |
|---|---|---|---|---|---|
| CRITICAL SITUATION | CANNOT GET DATA - NO CONNECTIVITY - | CANNOT GET DATA - NO ACCESS TO DATA - | CANNOT WRITE DATA - NO CONNECTIVITY - | CANNOT WRITE DATA - REQUEST CANNOT BE COMPLETED - | CANNOT WRITE DATA - DATA HAS BEEN UPDATED ON THE BACKEND - |
| EXPECTED BEHAVIOR | INDICATE THAT APPLICATION CANNOT BE USED BECAUSE OF MISSING CONNECTIVITY  SHOW DATA, IF AVAILABLE IN MEMORY | DISPLAY DETAILED ERROR RESPONSE | SHOW CONNECTIVITY STATUS, ASK USER TO REPEAT STEP | DISPLAY DETAILED ERROR RESPONSE, ASK USER TO REPEAT STEP | APPLICATION SPECIFIC: OFFER CONFLICT RESOLUTION OR OVERWRITE BACKEND DATA |
| CONTEXT PARAMETER SETTINGS (HTTP CODE) | -AIRPLANE MODE ON -NO CONNECTIVITY TO GATEWAY/ BACKEND (503) | -NO AUTHORIZATION (401) -OBJECT DOES NOT EXIST (410) -TECHNICAL ERROR IN BACKEND (500) | -AIRPLANE MODE ON -NO CONNECTIVITY TO GATEWAY/ BACKEND (503) | -NO AUTHORIZATION (401) -OBJECT DOES NOT EXIST ANY MORE (410) -OBJECT LOCKED (409) -CONNECTIVITY LOST BETWEEN GATEWAY AND BACKEND AFTER COMMIT TRANSACTION IN BACKEND (500) -TECHNICAL ERROR IN BACKEND (500) | -OBJECT HAS BEEN CHANGED (500 + BUSINESS EXCEPTION + eTAG) |

| PARAMETER | DESCRIPTION | FIRST VALUE | SECOND VALUE |
|---|---|---|---|
| A | APPLICATION | | |
| D | DEVICE | | |
| D1 | AIRPLANE MODE | OFF | ON |
| D2 | LANGUAGE | EN | DE |
| D3 | PUSH RECEIVED? | OWN APPLICATION | OTHER APPLICATION |
| D4 | APPLICATION START STATE | NOT IN REC APPLICATION LIST | IN REC APPLICATION LIST |
| D5 | DEVICE RESTARTED? | NO | YES |
| D6 | BATTERY STATUS | FULL | MINIMUM |
| D7 | APPLICATION CACHE | EMPTY | FILLED |
| D8 | OFFLINE DATA CACHE | EMPTY | FULL |
| D9 | IOS MEMORY STATUS | INITIAL | FULL |
| | | | |
| C | CONNECTIVITY | | |
| C1 | CONNECTIVITY TYPE | WLAN | 3G |
| C2 | CONNECTIVITY STRENGTH | FULL | 2 BARS |
| C3 | CONNECTIVITY RELIABILITY | VERY HIGH | LOW |
| | | | |
| B | BACKEND | | |
| B1 | USER EXISTS | Y | N |
| B2 | USER ACCESS TO DATA | Y | N |
| B3 | OBJECT EXISTS | Y | N |
| B4 | OBJECT LOCKED | N | Y |
| B5 | OBJECTS DETAILS IN BACKEND | EMPTY | O1 |
| B6 | OBJECT LIST ENTRIES | L1 | L2 |

FIG. 8B  870

| Airplane mode off/on | | | | | | | | | | TC | | | |
|---|---|---|---|---|---|---|---|---|---|---|---|---|---|
| Teststep | 1 | 2 | 3 | 4 | 5 | 6 | 7 | 8 | 9 | | | 1 | Special condition off |
| State | 11 | 1 | 12 | 2 | 12 | 2 | 13 | 1 | | 1 — 872 | | 11 | Special condition on |
| | | 1 | 13 | 12 | 13 | X | | | | 2 — 874 | | | |
| | | 1 | 2 | 3 | 14 | 13 | 3 | 13 | | 3 — 876 | | | |
| | | 1 | 2 | 3 | 14 | 2 | 3 | 14 | 4 | 4 — 878 | | | |

FIG. 10B  1050

| Connectivity lost | | | | | | | | | | TC |
|---|---|---|---|---|---|---|---|---|---|---|
| Teststep | 1 | 2 | 3 | 4 | 5 | 6 | 7 | 8 | 9 | |
| State | 1 | 2 | 1 | 2 | 3 | 4 | 5 | | | 1 |
| | | 1 | 2 | 13X | | | | | | 2 |
| | 11 | 1 | 2 | 13 | | | | | | 3 |
| | | 1 | 2 | 12 | | | | | | 4 |
| | | 1 | 2 | 3 | 14 | 2 | 3 | 14 | 4 | 5 |

TESTING MOBILE APPLICATIONS

TECHNICAL FIELD

The present disclosure relates to computer-implemented methods, software, and systems for identifying test cases for a mobile application.

BACKGROUND

Software testing is an investigation into the quality of a particular application, module, or other software component, and is meant to provide an objective and independent view of the tested software to allow developers and other interested parties information on any issues, errors, or risks associated with execution of the tested software. Testing can be used prior to software launches to remove the number of issues that may arise in a deployment-type situation. In some instances, testing can validate and verify that a software component: (1) meets its design requirement and description; (2) works as expected; (3) can be implemented as defined; and (4) satisfies user needs and potential execution environments.

SUMMARY

The present disclosure involves systems, software, and computer implemented methods for identifying test cases. One example process includes operations for identifying a mobile application to perform testing upon. A test environment and at least one risk situation associated with the mobile application are identified. For each of the at least one identified risk situations, at least one risk situation-relevant context parameter is identified. A standard operations path is created, as is at least one operations path-variant for each of the at least one identified risk situation-relevant context parameters. The corresponding operations path-variant is analyzed to identify a set of test cases for the context parameter, for each of the at least one identified context parameters.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 3 is an example risk matrix.

FIG. 7 is a list of context parameters and corresponding first and second values.

FIG. 8B is an example test vector for an airplane mode context parameter.

FIG. 10B is an example test vector for a connectivity strength context parameter.

DETAILED DESCRIPTION

Figure 1:
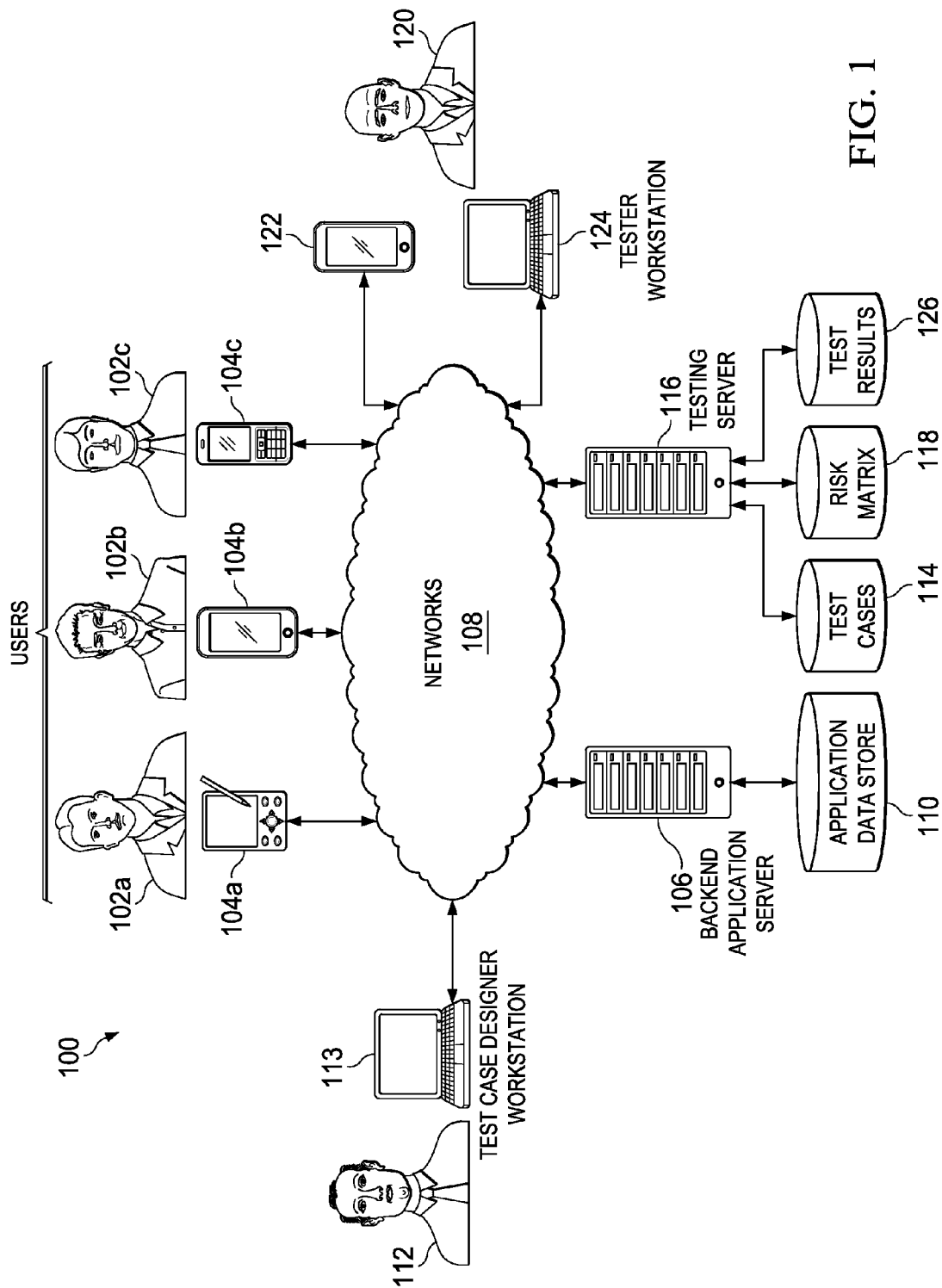
FIG. 1 is a block diagram illustrating an example environment for identifying test cases for a mobile application.

Mobile applications can present challenges for software testers. In addition to an executing mobile application being in a particular state, a number of other mobile application execution environment entities can each be in one of a various number of states. For example, a mobile device upon which the mobile application is executing, mobile device connectivity, one or more middleware components, and one or more backend servers can each be associated with a set of context parameters, where each context parameter can have a set of associated values. To name a few examples, a mobile device can have an airplane mode context parameter that is either on or off, a mobile device can have a battery status that is either full, empty, or some other value, connectivity status can be high, low, none, or some other value, a data object can be locked or unlocked on a backend server, and a particular user may either have or not have access to a particular data object on a backend server.

The potential combinations of values for multiple context parameters for each of multiple entities that are associated with the mobile application can result in a very large number of potential test cases for the mobile application. For example, for each entity, the number of possible states for the entity can be estimated by determining the number of possible combinations of context parameter values associated with the entity (e.g., for a mobile device, a first combination may include airplane-mode-off and battery-status-full, and a second combination may include airplane-mode-on and battery-status-low). If there are, for example, fifteen mobile device context parameters and each context parameter can have two values, the number of possible mobile device states can be estimated as $2^{15}$ or 32,768.

The number of overall possible states to test for the mobile application can be estimated by multiplying the number of mobile application states by a determined estimate for each of the entities associated with the mobile application. For example, suppose that there are 10 mobile application states, 32,768 mobile device states, 8 connectivity states, and 16,384 backend server states. The number of possible test cases for the mobile application can be estimated to be 10*32,768*8*16,384, or a value of 42,949,672,960, which is more than is practical for a testing team to test, given time and budget constraints.

Thus, a challenge for a tester is to identify a subset of test cases to test which provides adequate test coverage. Adequate test coverage includes testing the features of the mobile application and also testing risk situations that may occur. A risk situation may occur, for example, if there is a condition for data loss. Such a condition may occur, for example, due to a change in a context parameter. For example, a memory status context parameter of a mobile device can transition from memory-available to memory-full. As another example, a connectivity-strength context parameter can transition from high to low.

A systematic test methodology can be defined that provides risk-based test case design that covers various state combinations. The test methodology can combine state oriented testing with analysis of critical areas to define test coverage criteria. The test methodology can identify a set of test cases that provides test coverage for application states and identified critical areas, where the number of test cases is manageable to design and manageable to test, in light of software project planning FIG. 1 is a block diagram illustrating an example environment 100 for identifying test cases for a mobile application. Users 102a, 102b, and 102c can use respective mobile devices 104a, 104b, and 104c to interact with an instance of the mobile application that is installed on each respective mobile device 104a, 104b, or 104c. The mobile application can communicate with a backend application server 106 over one or more networks 108. The mobile application can request that the backend application server 106 read data from and/or write data to an application data store 110. The backend application server 106 can include or can communicate with various middleware components (not shown).

As part of the development of the mobile application, a testing team may test functionality of the mobile application. For example, a test case designer 112 can use a test case designer workstation 113 to create a set of test cases for the mobile application. The test cases can be stored in a test case repository 114 accessible from a testing server 116. The test case designer 112 can design test cases such that the set of test cases provides adequate test coverage while still including a manageable number of test cases (e.g., a number of test cases that can be created and tested in an amount of time that is acceptable for initial and ongoing development of the mobile application). Identifying such a set of test cases can be challenging, because the mobile application can encounter many risk situations which should be tested. Accordingly, a potential number of test cases which can be created can be overwhelming and unmanageable without a structured process for designing test cases.

To create a set of test cases for the mobile application using a structured process, the test case designer 112 can identify a test environment, such as a mobile device operating system and a mobile device type upon which to test the mobile application. The test case designer 112 can create a standards operations path for the mobile application. The standards operations path can be depicted, for example, using a state diagram. The standards operations path can indicate, for example, states and state transitions that are relevant for execution of the mobile application when such execution does not include error or exception conditions.

In addition to creating a standard operations path, the test case designer 112 can identify one or more risk situations associated with the mobile application. A risk situation can be a situation that a mobile application may encounter which involves potential risk, such as data loss. Example risk situations include an inability to retrieve data (e.g., from the application data store 110), a lack of connectivity (e.g., to the backend application server 106 or to one or more of the networks 108), backend data changed (e.g., in the application data store 110) by another entity since data retrieval, and an inability to write data (e.g., to the application data store 108). The risk situations can be identified, for example, using an architecture risk matrix, such as a predefined risk matrix retrieved from a risk matrix repository 118.

A number of context parameters can be associated with the mobile application. Context parameters associated with the mobile application can include, for example, mobile device state context parameters, connectivity state context parameters, middleware state context parameters, and backend state context parameters. The test case designer 112 can identify one or more risk situation-relevant context parameters for each of the identified risk situations, for example, by using the risk matrix. For example, for a lack of connectivity risk situation, the test designer 112 can identify an "airplane mode" context parameter (e.g., if the mobile device 104a has an airplane mode setting turned on, the mobile device 104a might not be able to communicate over the networks 108).

The test case designer 112 can create one or more operations path-variants for each of the identified context parameters. An operations path-variant for a context parameter can be, for example, a modification of the standard operations path to include a set of exception states and corresponding state transitions that can occur in response to the context parameter switching from a first value to a second value. For example, the standards operations path can be designed with an assumption that an airplane mode setting of the mobile device upon which the mobile application is being executed is in a standard state (e.g., airplane mode off). An operations path-variant for the airplane mode context parameter can include exception states and corresponding state transitions which correspond to states that can occur in the mobile application if the airplane mode is transitioned from the standard, off state to a non-standard, on state.

After creating an operations path-variant, the test case designer 112 (or in some, implementations, an automated process) can analyze the operations path-variant to identify a set of test cases for the context parameter. For example, the test case designer 112 or the automated process can identify possible paths through the operations path-variant, where each possible path includes a set of standard and/or exception states. The test case designer 112 or the automated process can select, as a set of test cases for the mobile application, a set of possible paths such that each state in the operations path-variant is included in at least one selected possible path. The test designer 112 or the automated process can also identify one or more expected outputs or results for each selected path, such as an expected output or result for each state transition. The test case designer 112 or the automated process can perform a similar set of steps for each of the identified context parameters. The set of test cases identified for each context parameter can be stored in the test cases repository 114.

After test cases have been identified, a tester 120 and/or an automated testing process can execute the test cases to perform testing of the mobile application. For example, the tester 120 can use a test mobile device 122 to access the mobile application and to transition the mobile application through the standard and/or exception states that are included in the selected paths that are included in each test case. As another example, the tester 120 can use a tester workstation 124 to execute a simulation environment (e.g., that simulates various mobile device configurations), where the simulation environment may be executed on or may be in communication with the testing server 116. The tester 120 and/or the automated testing process can compare actual outputs and results to expected outputs and results. If the actual outputs and results for a test case match expected outputs and results for the test case, an indication of a successful test can be stored in a test results repository 126. If the actual outputs and results for a test case do not match the expected outputs and results for the test case, an indication of a failed test can be stored in the test results repository 126, and one or more developers of the mobile application can investigate the test failure.

As used in the present disclosure, the term "computer" is intended to encompass any suitable processing device. For example, although FIG. 1 illustrates a single backend application server 106, the environment 100 can be implemented using two or more servers 106, as well as computers other than servers, including a server pool. Indeed, the backend application server 106 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the backend application server 106 may be adapted to execute any operating system, including Linux, UNIX, Windows, Mac OS®, Java™, Android™, iOS or any other suitable operating system. According to one implementation, the backend application server 106 may also include or be communicably coupled with an e-mail server, a Web server, a caching server, a streaming data server, and/or other suitable server.

The backend application server 106 also includes an interface, one or more processors, and a memory (each not shown). The interface is used by the backend application server 106 for communicating with other systems in a distributed environment—including within the environment 100—connected to the networks 108; for example, the mobile devices 104a-c and 122, as well as other systems communicably coupled to the networks 108, such as the test case designer workstation 113, the tester workstation 124, and the testing server 116. Generally, the interface comprises logic encoded in software and/or hardware in a suitable combination and operable to communicate with the networks 108. More specifically, the interface may comprise software supporting one or more communication protocols associated with communications such that the networks 108 or interface's hardware is operable to communicate physical signals within and outside of the illustrated environment 100.

Each processor included in the backend application server 106 may be a central processing unit (CPU), a blade, an application specific integrated circuit (ASIC), a field-programmable gate array (FPGA), or another suitable component. Generally, each processor included in the backend application server 106 executes instructions and manipulates data to perform the operations of the backend application server 106. Specifically, each processor included in the backend application server 106 executes the functionality required to receive and respond to requests from the mobile devices 104a-c, the test mobile device 122, the test case designer workstation 113, the tester workstation 124, and the testing server, to name a few examples.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The backend application server 106 includes a memory or multiple memories. The memory included in the backend application server 106 may include any type of memory or database module and may take the form of volatile and/or non-volatile memory including, without limitation, magnetic media, optical media, random access memory (RAM), read-only memory (ROM), removable media, or any other suitable local or remote memory component. The memory may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the backend application server 106.

The mobile devices 104a-c and 122 may be any computing device operable to connect to or communicate with at least the backend application server 106 via the networks 108 using a wireline or wireless connection. In general, the mobile devices 104a-c and 122 comprise an electronic computer device operable to receive, transmit, process, and store any appropriate data associated with the environment 100 of FIG. 1. The mobile devices 104a-c and 122 can include one or more client applications, including, for example, the mobile application to be tested. A client application is any type of application that allows the mobile devices 104a-a or 122 to request and view content on the respective mobile device. In some implementations, a client application can use parameters, metadata, and other information received at launch to access a particular set of data from the backend application server 106. In some instances, a client application may be an agent or client-side version of the one or more enterprise applications running on the backend application server 106.

The mobile devices 104a-c and 122 further include an interface, one or more processors, and a memory (each not shown). Such an interface of a respective mobile device 104a-c or 122 can be for communicating with other systems in a distributed environment—including within the environment 100—connected to the network 106; for example, the backend application server 106, as well as other systems communicably coupled to the networks 108. Generally, the interface of a respective mobile device 104a-c or 122 comprises logic encoded in software and/or hardware in a suitable combination and operable to communicate with the networks 108. More specifically, the interface of a respective mobile device 104a-c or 122 may comprise software supporting one or more communication protocols associated with communications such that the networks 108 or interface's hardware is operable to communicate physical signals within and outside of the illustrated environment 100.

Each processor included in the mobile devices 104a-c or 122 may be a central processing unit (CPU), an application specific integrated circuit (ASIC), a field-programmable gate array (FPGA), or another suitable component. Generally, each processor included in the mobile devices 104a-c or 122 executes instructions and manipulates data to perform the operations of the respective mobile device. Specifically, each processor included in the mobile devices 104a-c or 122 executes the functionality required to send requests to the backend application server 106 and to receive and process responses from the backend application server 106.

The memory included in the mobile devices 104a-c and 122 may include any memory or database module and may take the form of volatile or non-volatile memory including, without limitation, magnetic media, optical media, random access memory (RAM), read-only memory (ROM), removable media, or any other suitable local or remote memory component. The memory included in the mobile devices 104a-a and 122 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the respective mobile device.

There may be any number of mobile devices associated with, or external to, the environment 100. For example, while the illustrated environment 100 includes four mobile devices, alternative implementations of the environment 100 may include any number of mobile devices communicably coupled to the backend application server 106 and/or the networks 108. Additionally, there may also be one or more additional mobile devices external to the illustrated portion of environment 100 that are capable of interacting with the environment 100 via the networks 108. Further, the term "client", "mobile device" and "user" may be used interchangeably as appropriate without departing from the scope of this disclosure. Moreover, while the mobile devices 104a-c and 122 are described in terms of being used by a single user, this disclosure contemplates that many users may use one computer, or that one user may use multiple computers.

The mobile devices 104a-c and 122 are intended to encompass any mobile computing device such as a laptop/notebook computer, wireless data port, smart phone, personal data assistant (PDA), tablet computing device, one or more processors within these devices, or any other suitable processing device. For example, the mobile devices 104a-c and 122 may comprise a computer that includes an input device, such as a keypad, touch screen, or other device that can accept user information, and an output device that conveys information associated with the operation of the backend application server 106 or the respective mobile device itself, including digital data, visual information, or a graphical user interface.

Figure 2:
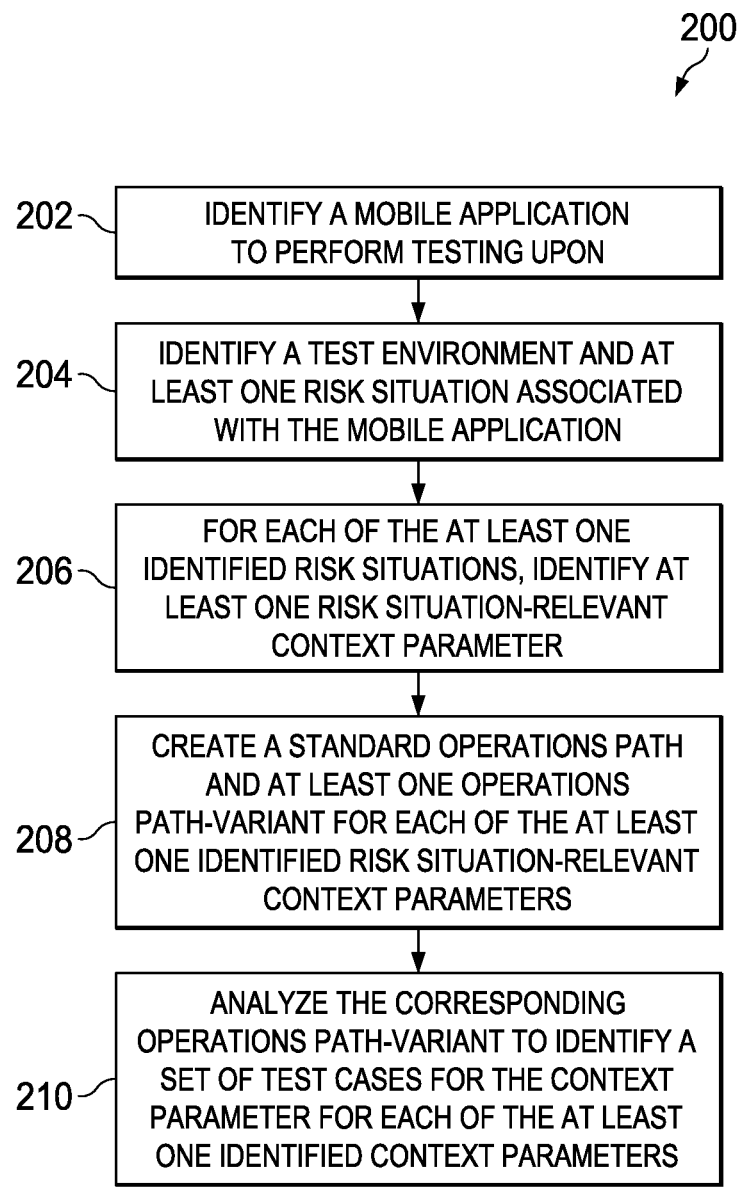
FIG. 2 is a flowchart of an example method for identifying test cases.

FIG. 2 is a flowchart of an example method 200 for identifying test cases. For clarity of presentation, the description that follows generally describes method 200 and related methods in the context of FIG. 1. However, it will be understood that method 200 and related methods may be performed, for example, by any other suitable system, environment, software, and hardware, or a combination of systems, environments, software, and hardware, as appropriate. For example, one or more of the backend application server 106, the testing server 116, some other computing device (not illustrated), or the test case designer 112 can be used to execute method 200 and related methods.

At 202, a mobile application to perform testing upon is identified. The mobile application can be, for example, a read-only application, such as an application that displays order status. Other examples include approval applications which involve setting a flag and submitting a corresponding value to a backend server, form applications which allow a user to fill in form data and submit the form data to a backend server, and other types of applications, such as applications that include multiple input fields and provide multiple methods for submission of data to a backend server. Any suitable mobile application can be identified.

At 204, a test environment and at least one risk situation associated with the mobile application are identified. The test environment can be associated with, for example, a particular mobile device operating system, and/or particular mobile device hardware. For example, the mobile application may be able to be executed on multiple operating systems and/or multiple device types. In some implementations, multiple versions (e.g., multiple runtime executables) of the mobile application may exist, such as one version for each of multiple operating system/hardware combinations. Identifying the test environment can ensure that the correct version of the mobile application is used. Risk situations can be identified, for example, using a predefined risk matrix. For example, all risk situations included in the risk matrix that are applicable to the mobile application can be identified.

For example, FIG. 3 is an example risk matrix 300. The risk matrix 300 may include, for example, information that is relevant for all mobile applications developed by an organization. The risk matrix 300 describes critical areas and related context parameters for mobile applications with respect to a risk of data loss (which can be considered a highest risk in business critical applications). The risk matrix 300 includes columns 302-310 for respective risk situations of inability to read data due to lack of connectivity, inability to read data due to lack of access to data, inability to write data due to lack of connectivity, inability to write data due to inability to complete request, and inability to write data due to data having been updated on the backend since the application last read the data.

A test case designer can analyze the risk matrix 300 and identify risk situations that may occur during execution of the mobile application. For example, for a mobile application that displays order status, the risk situations corresponding to the columns 302 and 304 may be identified as being associated with the mobile application (e.g., the risk situations corresponding to the columns 306-310 may not be associated with the mobile application if the mobile application is a read-only application). As another example, for a mobile application that is an approval application or a form-based application, the risk situations corresponding to the columns 302-310 may be identified as being associated with the mobile application.

Returning to FIG. 2, at 206, at least one risk situation-relevant context parameter is identified for each of the at least one identified risk situations. Context parameters can be identified, for example, using the risk matrix. For instance, in the risk matrix 300 of FIG. 3, context parameters and associated settings that are relevant to respective risk situations are included in a row 312. For example, an airplane mode and an "on" value are listed as being relevant for the inability to read data due to lack of connectivity risk situation (e.g., cell 314) and the inability to write data due to lack of connectivity risk situation (e.g., cell 316). In general, context parameters that are relevant to a risk situation and relevant to the mobile application can be identified from a predefined set of context parameters, using either a risk matrix or some other suitable reference.

Figure 4:
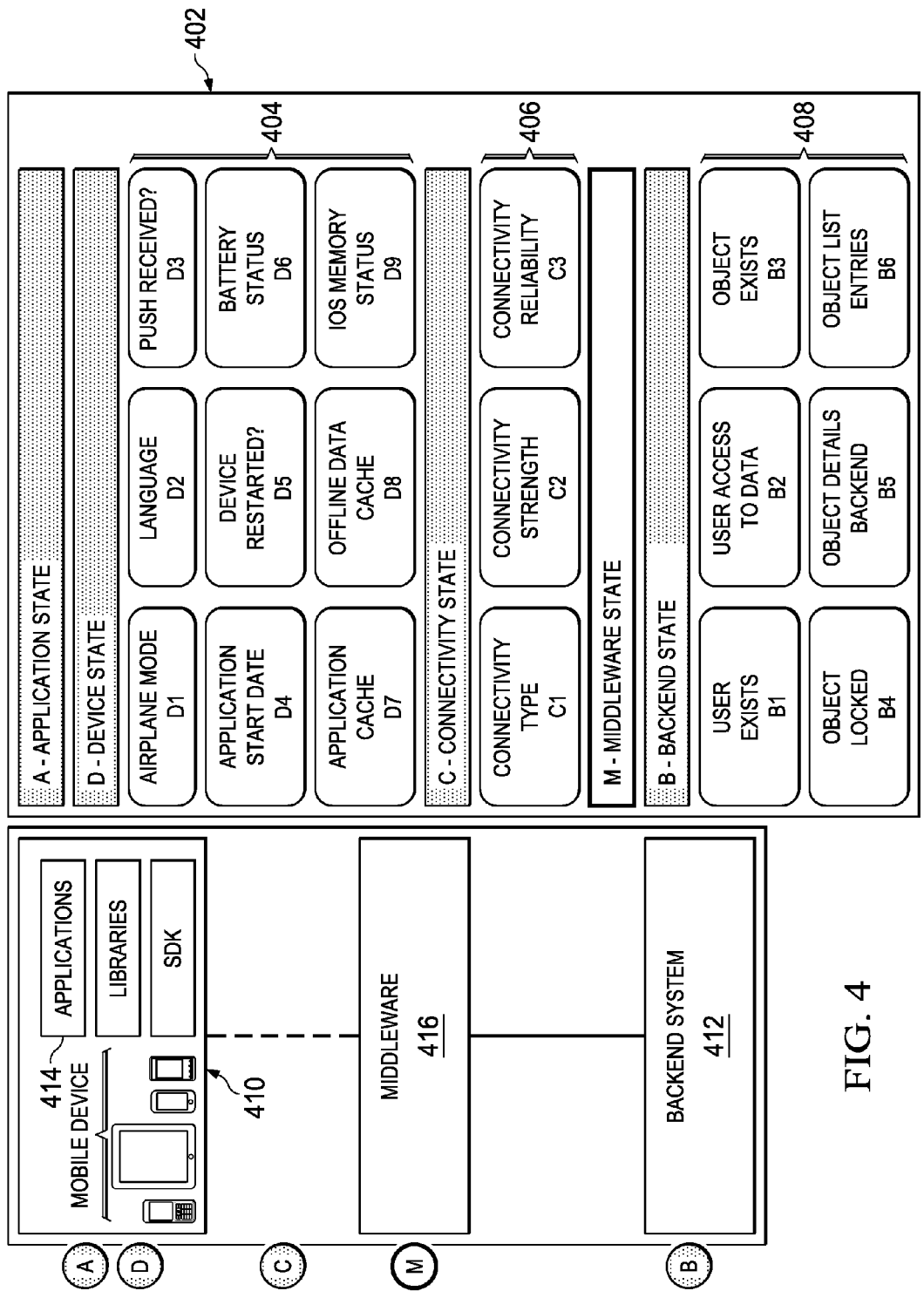
FIG. 4 illustrates example context parameters.

For example, FIG. 4 illustrates example context parameters 402 that include mobile device state context parameters 404, connectivity state context parameters 406, and backend state context parameters 408. The mobile device state context parameters 404 relate to the state of a mobile device, such as a mobile device 410, are denoted with "D" (e.g., for "device") and include, for example, airplane-mode ("D1"), language ("D2"), push-received ("D3"), application-start-state ("D4"), device-restarted ("D5"), battery-status ("D6"), application-cache-status ("D7"), offline-data-cache-status ("D8"), and memory-status ("D9").

The connectivity state context parameters 406 relate to the state of connectivity between a mobile device (e.g., the mobile device 410) and a backend server system (e.g., a backend system 412 or a remote database). The connectivity state context parameters are denoted with "C" (e.g., for "connectivity") and include connectivity-type ("C1"), connectivity-strength ("C2"), and connectivity-reliability ("C3").

The backend-state context parameters 408 relate to the state of a backend server system (e.g., the backend system 412). The backend-state context parameters 408 are denoted by "B" (e.g., for "backend"), and include user-existence-status ("B1"), user-data-access-status ("B2"), object-existence-status ("B3"), object-locked-status ("B4"), object-details-status ("B5"), and object-list-entries-status ("B6"). Other types of context parameters are possible, such as application-state context parameters (e.g., "A", such as corresponding to an application included in applications 414 on the mobile device 410) and middleware state context parameters (e.g., "M", such as corresponding to one or more middleware components 416). Additional and/or alternative states may be includes in other risk matrices, as appropriate.

Figure 5A:
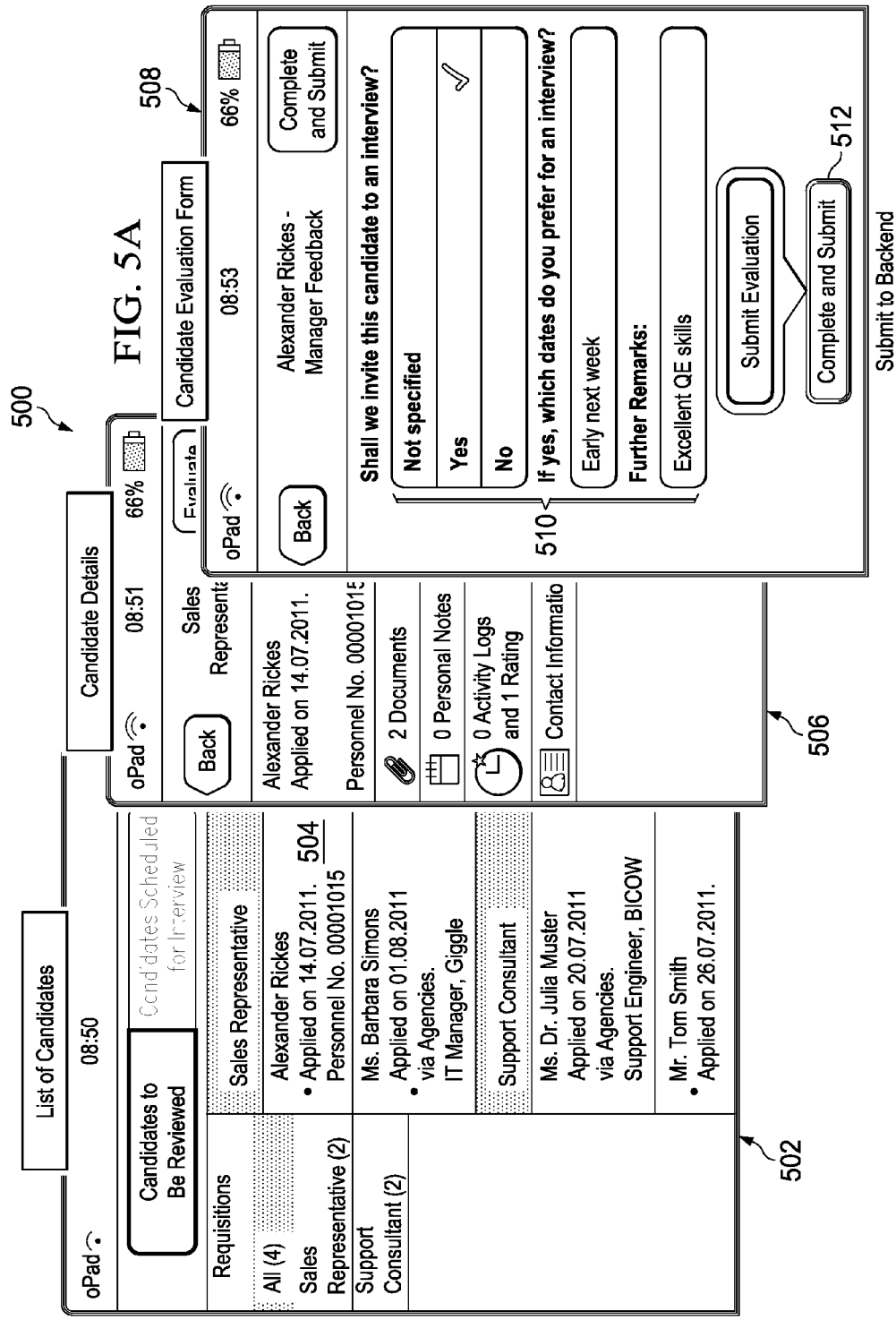
FIG. 5A illustrates an example mobile application.
Figure 5B:
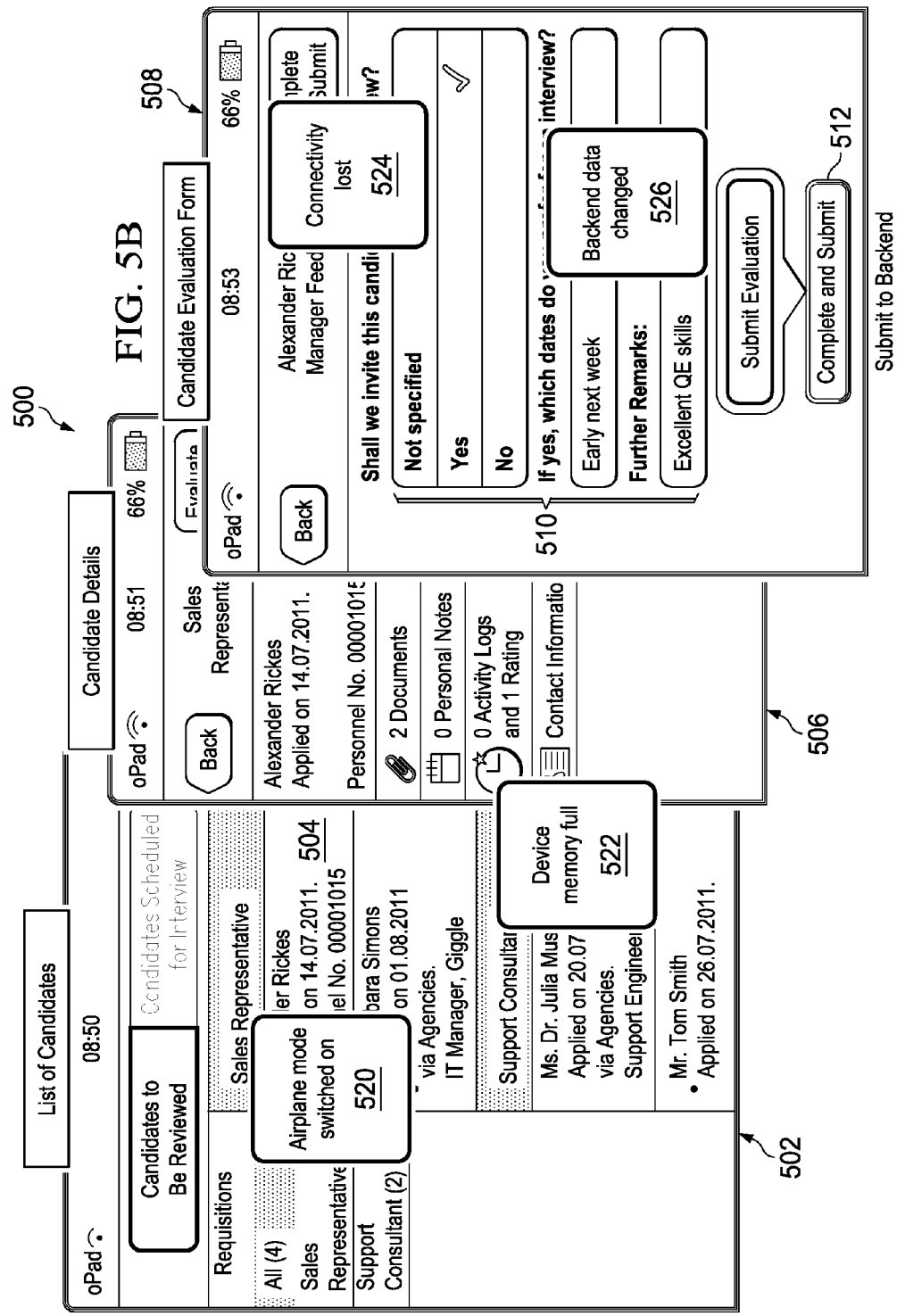
FIG. 5B illustrates example risk-situation relevant context parameters.

FIGS. 5A and 5B illustrate an example of identifying risk situation-relevant context parameters for risk situations related to an example mobile application 500. The mobile application 500 is an interview candidate assistant (e.g., management) application. The mobile application 500 includes a candidate list interface 502, from which a user can select an interview candidate, such as a candidate 504. After selecting a candidate, a candidate details interface 506 can be displayed. A user, such as a manager, can evaluate a selected candidate using a candidate evaluation interface 508. The user can fill in evaluation information using controls 510 and can submit the evaluation information to a backend server by selecting a submit control 512.

FIG. 5B illustrates example risk-situation-relevant context parameters that are associated with the example mobile application 500. For example, an airplane mode context parameter 520 transitioning from an off state to an on state after the candidate list interface 502 is displayed may be a risk situation for the mobile application 500, since if the airplane mode is on and the user selects a candidate, the mobile application 500 cannot communicate with a backend server to request candidate details for the selected candidate.

A device memory context parameter 520 being in a memory-full state can be a risk situation for the mobile application 500, since if the memory of the mobile device is full, the mobile application 500 may crash, disappear, or otherwise become unusable to the user of the mobile application 500. Additionally, data entered by the user, such as on the candidate evaluation interface 508, may be lost if the memory of the mobile device is full.

As another example, a connectivity strength context parameter 524 transitioning from a strong-signal state to a low-signal or no-signal state can be a risk situation for the mobile application 500 in a number of application states. For example, as mentioned, if there is no connectivity, candidate details for a selected candidate may not be able to be retrieved, nor would entered evaluation information be able to be submitted to a backend system. In some implementations, if there is no connectivity, resources (e.g., HTML (Hyper Text Markup Language), graphics, etc.) for one or more interfaces (e.g., the candidate details interface 506, the candidate evaluation interface 508) may not be able to be retrieved resulting in the inability to display such interfaces.

As yet another example, in some implementations, a backend-data-changed context parameter 526 having a "yes" or "true" value can be a risk situation for the mobile application 500. For example, suppose that while a first manager is entering evaluation information on the candidate evaluation interface 508, a second manager submits other evaluation information, from another mobile device. When the first manager submits the evaluation information entered by the first manager, a risk situation exists due to the presence of multiple sets of evaluation information. If such a risk situation is not handled, data loss may occur, such as a loss of data entered by the second manager if the data entered by the second manager is overwritten, or a loss of data entered by the first manager if the backend server system rejects the recording of the data submitted by the first manager due to a previous recording of evaluation information for the candidate. In some implementations, multiple sets of evaluation information can be stored in the backend system for a candidate.

Returning to FIG. 2, at 208, a standard operations path is created for the mobile application and at least one operations path-variant is created for each of the at least one identified risk situation-relevant context parameters. A standard operations path can include, for example, a set of standard states and standard state transitions for the mobile application, where a standard state is a state that is not associated with a risk situation, and may represent an ideal path of operations for the mobile application. A standard operations path can be illustrated, for example, using a state diagram.

Figure 6:
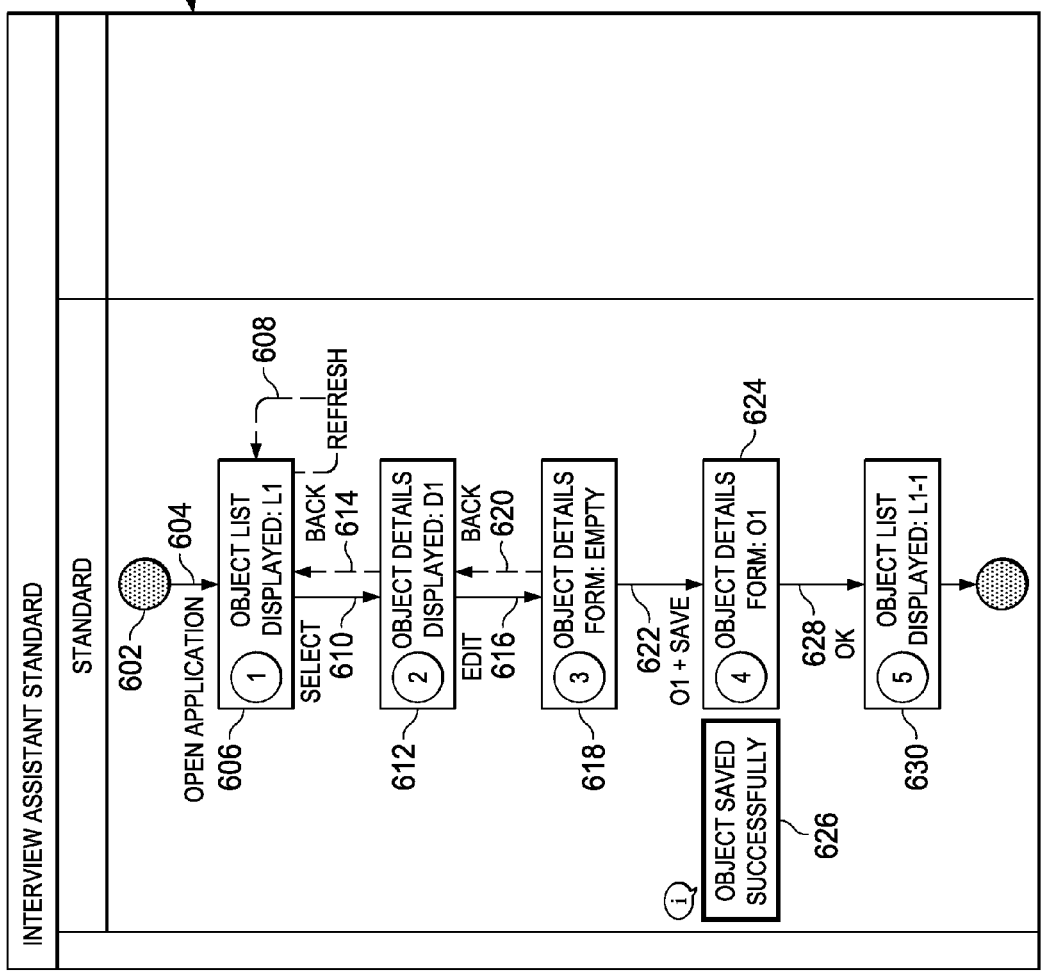
FIG. 6 is an example standard operations path.

For example, FIG. 6 is an example standard operations path 600 for the interview assistant mobile application 500 described above with respect to FIG. 5. From a starting state 602, an open-application action 604 is performed. In response to the open-application action 604, the mobile application transitions to a first state 606, in which an object list (e.g., candidate list) is displayed. From the first state 606, the user can perform a refresh action 608, which results in the retrieval of a current list of candidates and a return to the first state 606 for display of the current list of candidates. Also from the first state 606, the user can select a candidate, as illustrated by a select action 610.

In response to the select action 610, the mobile application transitions to a second state 612, in which object (e.g., candidate) details are displayed. From the second state 612, the user can perform a back action 614, which results in a return to the first state 606. As another example, the user can perform an edit action 616.

In response to the edit action 616, the mobile application transitions to a third state 618, in which the user is enabled to enter evaluation details for the selected candidate. From the third state 618, the user can perform a back action 620, which results in a return to the second state 612. As another example, the user can perform a save action 622, such as by selecting a submit or save control.

In response to the save action 622, the mobile application transitions to a fourth state 624. In the fourth state 624, a message 626 is displayed, indicating that the object (e.g., candidate evaluation information) has been successfully saved. In some implementations, the saved candidate evaluation information is also displayed. The user can dismiss the message 626, as illustrated by an "ok" action 628.

In response to the ok action 628, the mobile application transitions to a fifth state 630, in which the list of candidates is displayed. In some implementations, the list of candidates includes one or more indicators which indicate which candidates have been evaluated (e.g., an indicator can be displayed next to the just-evaluated candidate).

After creating the standard operations path, at least one operations path-variant is created for each identified risk situation-relevant context parameter. An operations path-variant can be created, for example, as a modification of the standard operations path. For example, an operations path-variant can include a set of exception states and exception state transitions that can occur in response to the corresponding context parameter having a particular value. For example, an operations path-variant can be created for an airplane mode context parameter which indicates variations in the standard operations path if the airplane mode context parameter has a value of "On".

As another example, an operations path-variant for a context parameter can include a set of exception states and exception state transitions that can occur in response to the context parameter transitioning from a first context parameter value to a second context parameter value during execution of the particular operations path-variant. The standard operations path can represent, for example, states in which the context parameter has the first value during execution of the mobile application and the operations path-variant can represent states which result from the context parameter transitioning from the first value to the second value.

For example, FIG. 7 is a list 700 of context parameters and corresponding first and second values. For example, the list 700 includes an airplane mode context parameter 702 which includes an associated first value of "Off" 704 and an associated second value of "On" 706. An operations path-variant can be created for the context parameter 702 which can include a set of exception states and exception state transitions that can occur in response to the airplane mode context parameter transitioning from the "Off" value 704 to the "On" value 706. For the interview assistant mobile application, an operations path-variant can be created for each of the context parameters included in the list 700.

Figure 8A:
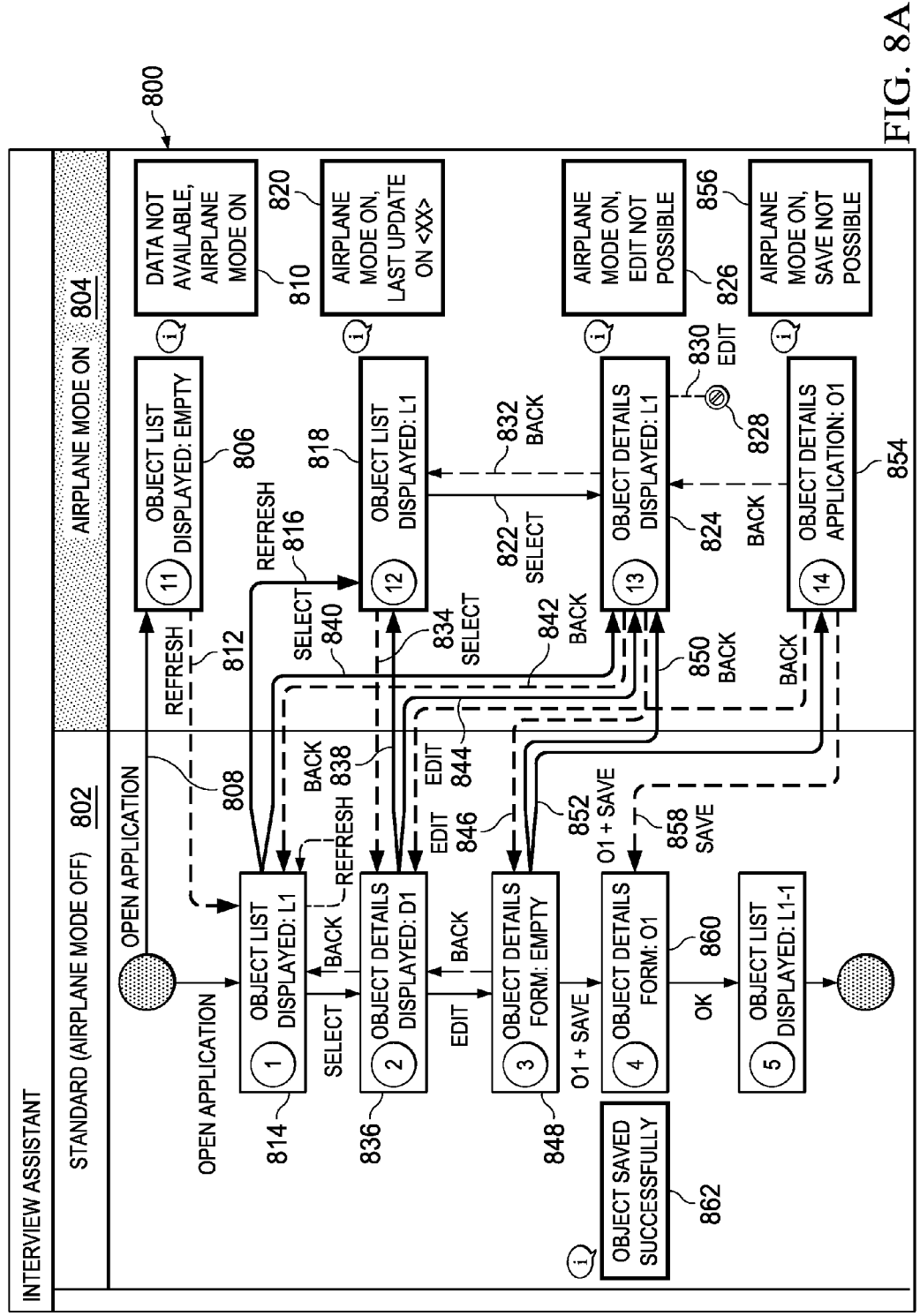
FIG. 8A is an example of an operations path-variant for an example mobile application and for a state transition of an airplane mode context parameter switching from a standard value of "Off" to a non-standard value of "On".

FIG. 8A is an example operations path-variant 800. The operations path-variant 800 is for the example interview assistant mobile application and for a state transition of an airplane mode context parameter switching from a standard value of "Off" to a non-standard value of "On". The operations path-variant 800 includes a left column 802 which generally corresponds to the standards operations path 700 described above with respect to FIG. 7.

The operations path-variant 800 also includes a right column 804 which indicates states that can occur in the interview assistant application as a result of the airplane mode context parameter transitioning to a non-standard "On" value. Arrows that flow from the left column 802 to the right column 804 indicate actions that can occur after the airplane mode context parameter has transitioned from the standard "Off" value to the non-standard "On" value (e.g., resulting in a transition to an exception state). Arrows that flow from the right column 804 to the left column 802 indicate actions that can occur after the airplane mode context parameter has transitioned from the non-standard "On" value to the standard "Off" value (e.g., resulting in a transition to a standard state).

For example, an exception state "11" 806 (e.g., in some implementations, exception states are indicated by a two digit state number) represents an exception state which results from an open-application action 808 being performed when the airplane mode is on. In the exception state "11", an empty object (e.g., candidate) list is displayed along with a message 810, which indicates that data is not available due to the airplane mode being on. If the airplane mode transitions from an "On" value to an "Off" value and a user performs a refresh action 812, the mobile application transitions to a first standard state 814, in which a list of candidates is displayed after candidate information is retrieved (e.g., which can be possible once connectivity is restored). The refresh action 814 can also be performed automatically by the mobile application, in response to the mobile application detecting that the airplane mode is "Off".

If the user (or the mobile application) performs a refresh action 816 while the mobile application is in the first standard state 814 and after the airplane mode transitions to an "On" value, the mobile application transitions to an exception state "12" 818. In the exception state "12", the previously-received list of candidates is displayed along with an information message 820 which indicates that the airplane mode is on and that includes a last update date and time.

If the user performs a select action 822 while the mobile application is in the exception state "12", the mobile application transitions to an exception state "13" 824. In the exception state "13", a message 826 is displayed, which indicates that the airplane mode is on and that editing is not possible (e.g., as illustrated by a null state 828 connected to an edit action 830). In some implementations, previously-received object (e.g., candidate) details may be displayed when the mobile application transitions to the exception state "13". In some implementations, the message 826 can indicate that candidate details cannot be displayed. When the mobile application is in the exception state "13", the user can perform a back action 832, which results in the mobile application transitioning back to the exception state "12".

If the user performs a select action 834 (e.g., selecting a displayed candidate) while the mobile application is in the exception state "12" and after the airplane mode transitions from the non-standard "On" value to the standard "Off" value, the mobile application transitions to a second standard state 836. In the second standard state 836, object (e.g., candidate) details are displayed for the selected candidate. If the user performs a back action 838 while the mobile application is in the second standard state 836 and after the airplane mode transitions to the "On" value, the mobile application transitions to the exception state "12", in which the message 820 is displayed indicating that the displayed candidate list may be out of date due to lack of connectivity.

If the user performs a select action 840 while the mobile application is in the first standard state 814 and after the airplane mode transitions to the non-standard "On" value from the standard "Off" value, the mobile application transitions to the exception state "13", in which the message 826 is displayed indicating that editing of the selected candidate is not possible.

If the user performs a back action 842 while the mobile application is in the exception state "13" and after the airplane mode transitions to the standard "Off" value, the mobile application transitions to the first standard state 814, in which a current list of candidates is displayed. If the user performs an edit action 844 while the mobile application is in the second standard state 836 and after the airplane mode has transitioned to the non-standard "On" value, the mobile application transitions to the exception state "13", in which the message 826 is displayed indicating that editing is not possible. If the user performs an edit action 846 while the mobile application is in the exception state "13" and after the airplane mode transitions to the standard "Off" value, the mobile application transitions to a third standard state 848, in which an evaluate candidate interface is displayed.

If the user performs a back action 850 while the mobile application is in the third standard state 848 and after the airplane mode transitions to the non-standard "On" value, the mobile application transitions to the exception state "13", in which the message 826 is displayed indicating that editing is not possible. If the user performs a save action 852 while the mobile application is in the third standard state 848 and after the airplane mode transitions to the non-standard "On" value, the mobile application transitions to an exception state "14" 854, in which a message 856 is displayed that indicates that the airplane mode is on and that saving is not possible.

If the user performs a save action 858 while the mobile application is in the exception state "14", such as after the airplane mode transitions to the standard "Off" value (e.g., in some implementations, a disabled save control may become enabled in response to restored connectivity), the mobile application transitions to a fourth standard state 860, in which a message 862 is displayed indicating that the save action 858 was successful.

Returning to FIG. 2, at 210, the corresponding operations path-variant is analyzed to identify a set of test cases for the context parameter for each of the at least one identified context parameters. For example, a tester or an automated process can identify as a test case a possible path through the operations path-variant, where a possible path includes a set of standard and/or exception states. A set of possible paths can be selected such that each exception state transition in the operations path-variant is included in at least one selected possible path.

As described above, standard states and exception states can have an identifying state number in the operations path-variant. In some implementations, states are numbered and colored according to type so that different types of states are easily distinguishable. For example, standard operation states can be numbered within a single digit range (e.g., 1-9) and can be colored in white, while operations path-variant states can be within a double digit range (e.g., 11-19) and can be colored in yellow. A transition from a single digit state to a double digit state (and correspondingly, from a white state to a yellow state) can indicate that a corresponding context parameter is to be changed (e.g., an airplane mode being set to on or off) before the transition is initiated. Accordingly, using numbers and colors for states can result in useful encoded information being included where states are displayed, such as either in a state diagram or in a test vector.

For example, a test case which includes a selected possible path can be represented by a set of state numbers which indicate the states that may be visited when executing the possible path. The set of all test cases for a context parameter can be represented by a test vector, where the test vector includes multiple sets of state numbers, one set of state numbers for each selected possible path.

For example, FIG. 8B is an example test vector 870 for the airplane mode context parameter. The test vector 870 describes first 872, second 874, third 876, and fourth 878 test cases. Each of the test cases 872-878 is described by a set of state numbers, where each state number is either a standard state (e.g., state numbers from one to four) or an exception state (e.g., state numbers from eleven to fourteen). For example, the second test case 874 is described as navigating through states one, thirteen, twelve, and thirteen (the "X" included in the row corresponding to the second test case 874 represents an edit action that should not be available in the mobile application at the end of executing the second test case 874). A tester or an automated process can select states for the test cases 872-878 such that each of the transitions to or from exception states eleven to fourteen are included in at least one test case.

Figure 9:
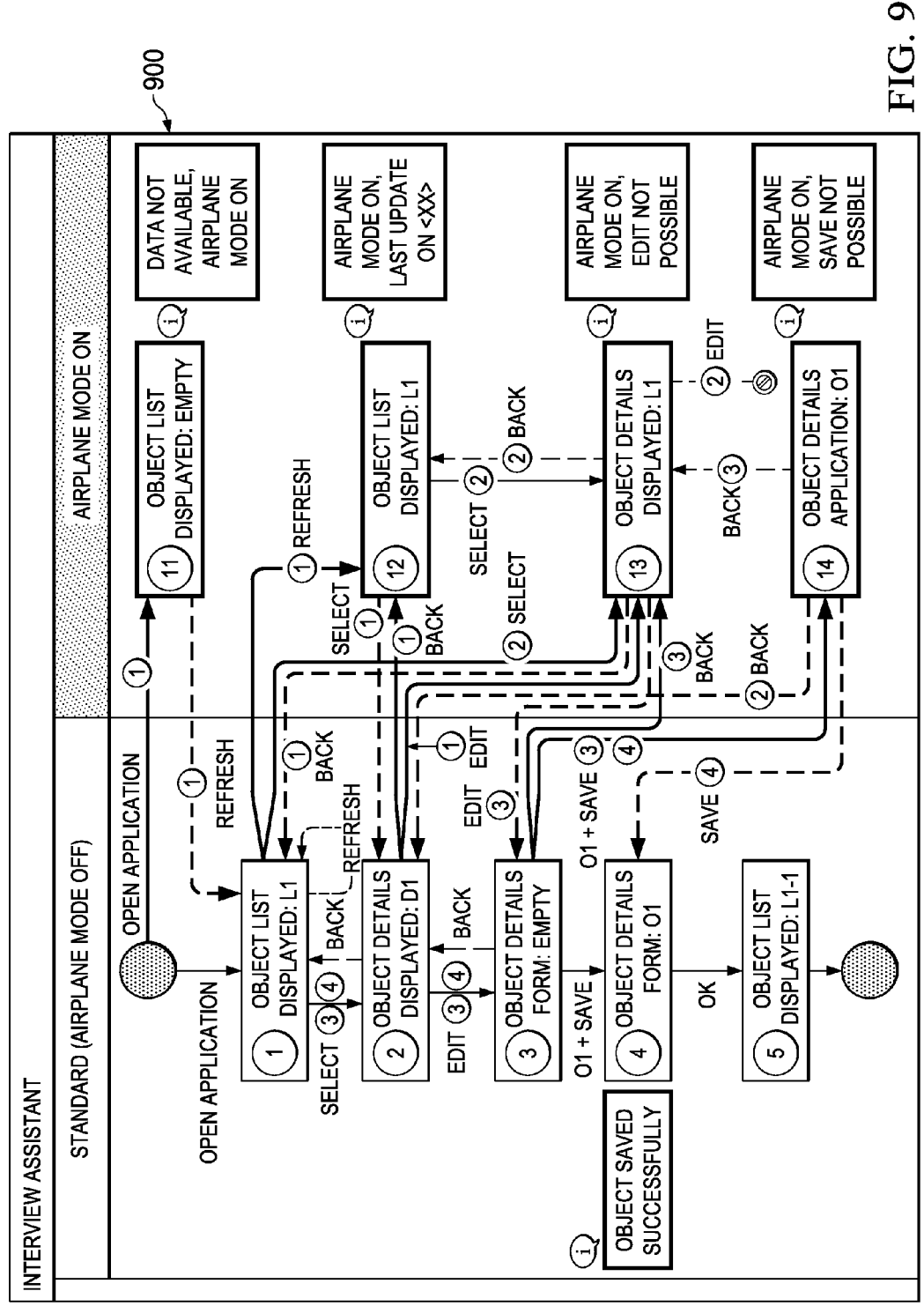
FIG. 9 illustrates test case coverage provided by an example operations path-variant.

For example, FIG. 9 is an operations path-variant 900 which generally corresponds to the operations path-variant 800 described above with respect to FIG. 8. On each of the transition/action arrows to or from exception states "11" to "14", a numbered circle indicates a test case number of a test case which includes (e.g., covers) such a transition. For example, as shown in FIG. 9, there is at least one test case indicator on each of the transition/action arrows to or from the exception states "11" to "14". In other words, four test cases provide coverage for all of the exception state transitions related to the airplane mode context parameter. Four test cases is a manageable number of test cases to create and to test (e.g., as compared to a potential number of test cases that could be created for the airplane mode context parameter, which may number in the hundreds or thousands).

As described above, a tester or an automated test process can execute test cases for a context parameter and can record test results by comparing expected results to actual results. Expected results can be obtained from a risk matrix. For example, referring again to FIG. 3, a row 320 can describe expected behavior for each risk situation. For example, for the risk situation 302 of inability to read data due to lack of connectivity, an expected behavior can be to show data if data is available in memory on the mobile device and to display a message if data is not available in memory, where the message indicates that the application cannot be used due to lack of connectivity.

The matrix 300 can also be used for test automation. For example, the row 312 includes information about HTTP (Hypertext Transfer Protocol) codes that may be relevant for certain risk situations and context parameter settings. For example, for the inability to read data risk situation 302 and the inability to write data risk situation 306, which are each related to the airplane mode context parameter, a relevant HTTP code is "503", which corresponds to "no connectivity to gateway/backend". Such a code can be used, for example, by an automated test process, such as where the process checks for such a code or generates such a code to simulate a risk situation.

Figure 10A:
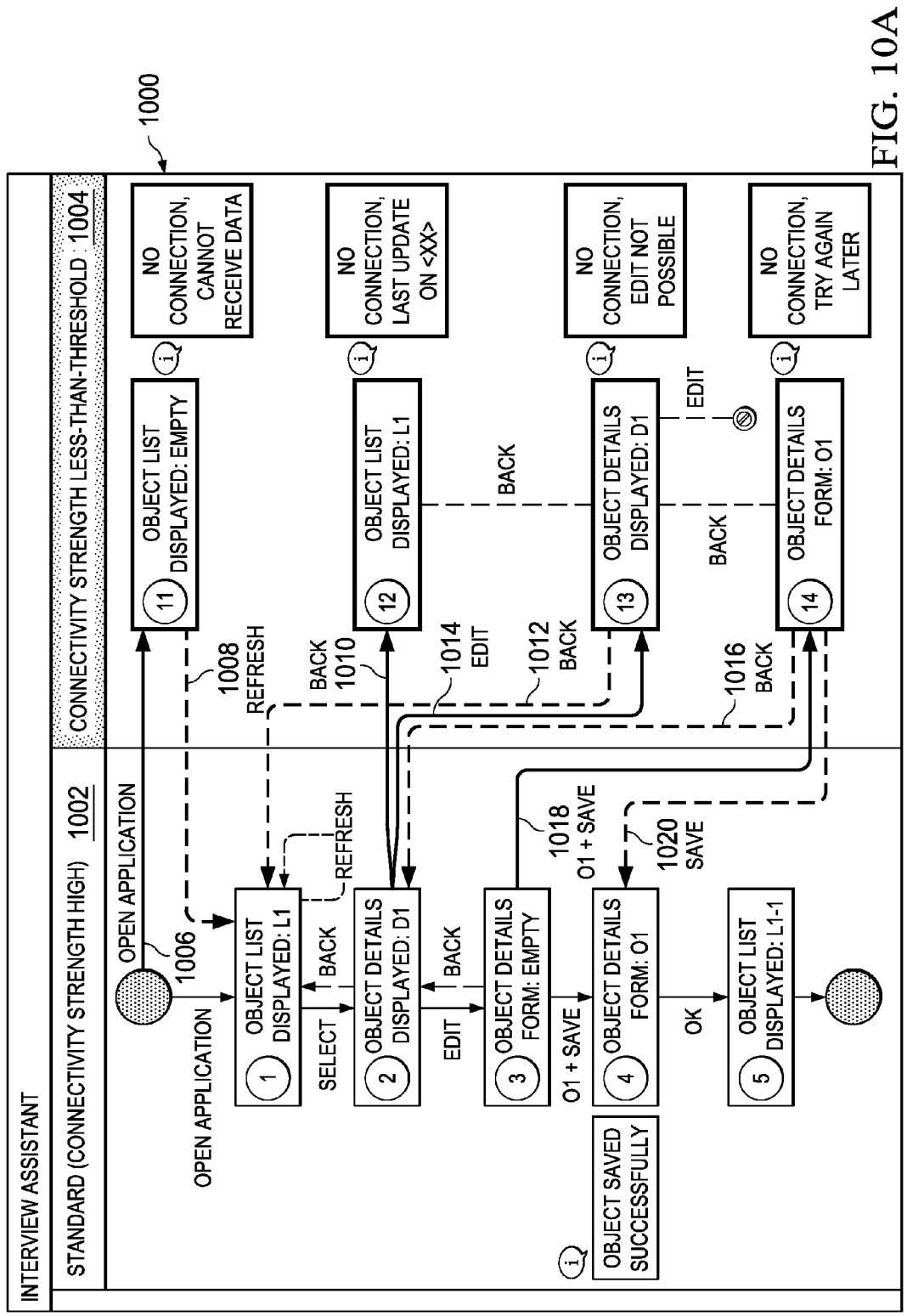
FIG. 10A is an example of an operations path-variant for an example mobile application and for a state transition of a connectivity strength context parameter switching from a standard value of "high" to a non-standard value of "less-than-threshold".

FIG. 10A is another example operations path-variant 1000 corresponding to a connectivity strength context parameter. The connectivity strength context parameter can have a standard value of "high", as illustrated in a standard operations path column 1002, and can have a non-standard "less-than-threshold" value, as illustrated in an exception column 1004. The threshold can be, for example "two bars". The "less-than-threshold" value can represent a situation where the mobile device has low or no connectivity.

The standard operations path column 1002 includes standard states one to five and generally corresponds to the standard operations path 600 described above with respect to FIG. 6. The exception column 1004 includes exception states eleven to fourteen. Transition arrows 1006-1020 represent actions that result in transition to or from an exception state.

FIG. 10B illustrates an example test vector 1050 which describes test cases for testing the operations path variant 1000 illustrated in FIG. 10A. The test vector 1050 describes five test cases. Executing the five test cases is sufficient to ensure testing coverage of each of the state transitions included in the operations path variant 1000.

The preceding figures and accompanying description illustrate example processes and computer-implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different orders than as shown. Moreover, environment 100 may use processes with additional steps, fewer steps, and/or different steps, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method performed by one or more processors for identifying test cases, the method comprising:
   identifying a mobile application to perform testing upon;
   identifying a test environment and at least one risk situation associated with the mobile application;
   for each of the at least one identified risk situations, identifying at least one risk situation-relevant context parameter;
   creating, for the mobile application, a standard operations path and at least one operations path-variant for each of the at least one identified risk situation-relevant context parameters, wherein the standard operations path includes a set of standard states and standard state transitions for the mobile application, wherein a standard state is not associated with a risk situation; and
   analyzing the corresponding operations path-variant to identify a set of test cases for the context parameter for each of the at least one identified context parameters.

2. The method of claim 1, further comprising executing a test case and recording a result of the test case execution.

3. The method of claim 1, wherein the identified test environment comprises one or more of a particular operating system and a particular mobile device type.

4. The method of claim 1, wherein each operations path-variant includes a set of exception states and exception state transitions that can occur in response to the corresponding context parameter transitioning from a first context parameter value to a second context parameter value during execution of the particular operations path-variant, wherein the context parameter has the first context parameter value during execution of the standard operations path.

5. The method of claim 4, wherein an operations path-variant includes a set of exception states and exception state transitions that can occur in response to the corresponding context parameter having a third context parameter value.

6. The method of claim 1, wherein analyzing the corresponding operations path-variant comprises identifying possible paths through the operations path-variant, where each possible path includes a set of standard and/or exception states.

7. The method of claim 6, wherein identifying a set of test cases for the context parameter comprises selecting a set of possible paths such that each state transition in the operations path-variant is included in at least one selected possible path.

8. The method of claim 1, wherein the risk situations comprise an inability to retrieve data, a lack of connectivity, backend data changed by another entity since data retrieval, and an inability to write data.

9. The method of claim 1, wherein the context parameters include mobile device state context parameters, connectivity state context parameters, middleware state context parameters, and backend state context parameters.

10. The method of claim 9:
   wherein the mobile device state context parameters include at least one of airplane mode, language, push input received, application start state, device restarted, battery status, application cache status, offline data cache status, and memory status;
   wherein the connectivity state context parameters include at least one of connectivity type, connectivity strength, and connectivity reliability; and
   wherein the backend state context parameters include at least one of user existence status, user data access status, object existence status, object locked status, object details status, and object list entries status.

11. A system comprising:
   one or more computers associated with an enterprise portal; and
   a computer-readable medium coupled to the one or more computers having instructions stored thereon which, when executed by the one or more computers, cause the one or more computers to perform operations comprising:
      identifying a mobile application to perform testing upon;
      identifying a test environment and at least one risk situation associated with the mobile application;
      for each of the at least one identified risk situations, identifying at least one risk situation-relevant context parameter;
      creating, for the mobile application, a standard operations path and at least one operations path-variant for each of the at least one identified risk situation-relevant context parameters; and
      analyzing the corresponding operations path-variant to identify a set of test cases for the context parameter for each of the at least one identified context parameters, wherein analyzing the corresponding operations path-variant comprises identifying possible paths through the operations path-variant, where each possible path includes a set of standard and/or exception states.

12. The system of claim 11, the operations further comprising executing a test case and recording a result of the test case execution.

13. The system of claim 11, wherein the identified test environment comprises one or more of a particular operating system and a particular mobile device type.

14. The system of claim 11, wherein identifying a set of test cases for the context parameter comprises selecting a set of possible paths such that each state transition in the operations path-variant is included in at least one selected possible path.

15. A computer-implemented method performed by one or more processors for identifying test cases, the method comprising:
   identifying a mobile application to perform testing upon;
   identifying a test environment and at least one risk situation associated with the mobile application;
   for each of the at least one identified risk situations, identifying at least one risk situation-relevant context parameter;
   creating, for the mobile application, a standard operations path and at least one operations path-variant for each of the at least one identified risk situation-relevant context parameters, wherein each operations path-variant includes a set of exception states and exception state transitions that can occur in response to the corresponding context parameter transitioning from a first context parameter value to a second context parameter value during execution of the particular operations path-variant, wherein the context parameter has the first context parameter value during execution of the standard operations path; and
   analyzing the corresponding operations path-variant to identify a set of test cases for the context parameter for each of the at least one identified context parameters.

16. The method of claim 15, further comprising executing a test case and recording a result of the test case execution.

17. The method of claim 15, wherein the identified test environment comprises one or more of a particular operating system and a particular mobile device type.

18. The method of claim 15, wherein analyzing the corresponding operations path-variant comprises identifying possible paths through the operations path-variant, where each possible path includes a set of standard and/or exception states.

19. A computer-implemented method performed by one or more processors for identifying test cases, the method comprising:
- identifying a mobile application to perform testing upon;
- identifying a test environment and at least one risk situation associated with the mobile application;
- for each of the at least one identified risk situations, identifying at least one risk situation-relevant context parameter;
- creating, for the mobile application, a standard operations path, wherein the standard operations path includes a set of standard states and standard state transitions for the mobile application and wherein a standard state is not associated with a risk situation;
- creating, for the mobile application, at least one operations path-variant for each of the at least one identified risk situation-relevant context parameters, wherein each operations path-variant includes a set of exception states and exception state transitions that can occur in response to the corresponding context parameter transitioning from a first context parameter value to a second context parameter value during execution of the particular operations path-variant and wherein the context parameter has the first context parameter value during execution of the standard operations path; and
- analyzing the corresponding operations path-variant to identify a set of test cases for the context parameter for each of the at least one identified context parameters, including:
  - identifying possible paths through the operations path-variant, where each possible path includes a set of standard and/or exception states; and
  - selecting a set of possible paths such that each state transition in the operations path-variant is included in at least one selected possible path.

20. A system comprising:
one or more computers associated with an enterprise portal; and
a computer-readable medium coupled to the one or more computers having instructions stored thereon which, when executed by the one or more computers, cause the one or more computers to perform operations comprising:
- identifying a mobile application to perform testing upon;
- identifying a test environment and at least one risk situation associated with the mobile application;
- for each of the at least one identified risk situations, identifying at least one risk situation-relevant context parameter;
- creating, for the mobile application, a standard operations path and at least one operations path-variant for each of the at least one identified risk situation-relevant context parameters, wherein the standard operations path includes a set of standard states and standard state transitions for the mobile application, wherein a standard state is not associated with a risk situation; and
- analyzing the corresponding operations path-variant to identify a set of test cases for the context parameter for each of the at least one identified context parameters.

21. A computer-implemented method performed by one or more processors for identifying test cases, the method comprising
- identifying a mobile application to perform testing upon;
- identifying a test environment and at least one risk situation associated with the mobile application;
- for each of the at least one identified risk situations, identifying at least one risk situation-relevant context parameter;
- creating, for the mobile application, a standard operations path and at least one operations path-variant for each of the at least one identified risk situation-relevant context parameters; and
- analyzing the corresponding operations path-variant to identify a set of test cases for the context parameter for each of the at least one identified context parameters, wherein analyzing the corresponding operations path-variant comprises identifying possible paths through the operations path-variant, where each possible path includes a set of standard and/or exception states.

22. A system comprising:
one or more computers associated with an enterprise portal; and
a computer-readable medium coupled to the one or more computers having instructions stored thereon which, when executed by the one or more computers, cause the one or more computers to perform operations comprising:
- identifying a mobile application to perform testing upon;
- identifying a test environment and at least one risk situation associated with the mobile application;
- for each of the at least one identified risk situations, identifying at least one risk situation-relevant context parameter;
- creating, for the mobile application, a standard operations path and at least one operations path-variant for each of the at least one identified risk situation-relevant context parameters, wherein each operations path-variant includes a set of exception states and exception state transitions that can occur in response to the corresponding context parameter transitioning from a first context parameter value to a second context parameter value during execution of the particular operations path-variant, wherein the context parameter has the first context parameter value during execution of the standard operations path; and
- analyzing the corresponding operations path-variant to identify a set of test cases for the context parameter for each of the at least one identified context parameters.

23. A system comprising:
one or more computers associated with an enterprise portal; and
a computer-readable medium coupled to the one or more computers having instructions stored thereon which, when executed by the one or more computers, cause the one or more computers to perform operations comprising:
- identifying a mobile application to perform testing upon;
- identifying a test environment and at least one risk situation associated with the mobile application;

for each of the at least one identified risk situations, identifying at least one risk situation-relevant context parameter;

creating, for the mobile application, a standard operations path, wherein the standard operations path includes a set of standard states and standard state transitions for the mobile application and wherein a standard state is not associated with a risk situation;

creating, for the mobile application, at least one operations path-variant for each of the at least one identified risk situation-relevant context parameters, wherein each operations path-variant includes a set of exception states and exception state transitions that can occur in response to the corresponding context parameter transitioning from a first context parameter value to a second context parameter value during execution of the particular operations path-variant and wherein the context parameter has the first context parameter value during execution of the standard operations path; and analyzing the corresponding operations path-variant to identify a set of test cases for the context parameter for each of the at least one identified context parameters, including:

identifying possible paths through the operations path-variant, where each possible path includes a set of standard and/or exception states; and selecting a set of possible paths such that each state transition in the operations path-variant is included in at least one selected possible path.

* * * * *